(12) United States Patent
Ishibashi et al.

(10) Patent No.: US 10,882,784 B2
(45) Date of Patent: Jan. 5, 2021

(54) GLASS PANEL UNIT MANUFACTURING METHOD AND GLASS WINDOW MANUFACTURING METHOD

(71) Applicant: PANASONIC INTELLECTUAL PROPERTY MANAGEMENT CO., LTD., Osaka (JP)

(72) Inventors: Tasuku Ishibashi, Osaka (JP); Eiichi Uriu, Osaka (JP); Kazuya Hasegawa, Osaka (JP); Masataka Nonaka, Osaka (JP); Hiroyuki Abe, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 70 days.

(21) Appl. No.: 15/764,266

(22) PCT Filed: Sep. 14, 2016

(86) PCT No.: PCT/JP2016/004180
§ 371 (c)(1),
(2) Date: Mar. 28, 2018

(87) PCT Pub. No.: WO2017/056419
PCT Pub. Date: Apr. 6, 2017

(65) Prior Publication Data
US 2018/0319707 A1    Nov. 8, 2018

(30) Foreign Application Priority Data

Sep. 29, 2015    (JP) .................................. 2015-192248

(51) Int. Cl.
*E06B 3/66*    (2006.01)
*C03C 27/10*    (2006.01)
(Continued)

(52) U.S. Cl.
CPC ........ *C03C 27/10* (2013.01); *B32B 17/10055* (2013.01); *C03C 27/06* (2013.01);
(Continued)

(58) Field of Classification Search
CPC ...... E06B 3/673; E06B 3/67334; E06B 6/677; E06B 3/6775
See application file for complete search history.

(56) References Cited

U.S. PATENT DOCUMENTS 6,541,083 B1 *   4/2003   Landa .................... C03C 27/06
                                                         428/34
8,202,587 B2 *   6/2012   Wang .................. E06B 3/66304
                                                         428/192
(Continued)

FOREIGN PATENT DOCUMENTS

JP       08-259276 A     10/1996
JP       11-92181 A      4/1999
(Continued)

OTHER PUBLICATIONS

International Search Report and Written Opinion issued in International Patent Application No. PCT/JP2016/004180, dated Dec. 13, 2016; with partial English translation.

*Primary Examiner* — Donald J Loney
(74) *Attorney, Agent, or Firm* — McDermott Will and Emery LLP (57) ABSTRACT

An object of the invention is to provide a glass panel unit manufacturing method and a glass window manufacturing method which enable a binder to be effectively removed from a glass adhesive, provide high adhesive strength between panels, and enable a vacuum space to be stably formed. A method for manufacturing a glass panel unit includes: disposing a glass adhesive to have one part as a low step part thinner than the other part of the glass adhesive; disposing a first substrate including at least a first
(Continued)

glass substrate and a second substrate including at least a second glass substrate to face each other; and heating glass composite to form an inner space; reducing the pressure of the inner space; and forming a vacuum space from the inner space. The glass adhesive includes glass powder and a binder.

4 Claims, 8 Drawing Sheets

(51) Int. Cl.
    *C03C 27/06*     (2006.01)
    *E06B 3/677*     (2006.01)
    *B32B 17/10*     (2006.01)
    *E06B 3/663*     (2006.01)
    *E06B 3/673*     (2006.01)

(52) U.S. Cl.
    CPC ........ *E06B 3/6612* (2013.01); *E06B 3/66304* (2013.01); *E06B 3/6775* (2013.01); *E06B 3/673* (2013.01); *E06B 3/677* (2013.01); *E06B 3/67334* (2013.01); *E06B 2003/66338* (2013.01); *Y02A 30/249* (2018.01); *Y02B 80/22* (2013.01)

(56) References Cited

U.S. PATENT DOCUMENTS

| | | | |
|---|---|---|---|
| 2012/0210750 A1* | 8/2012 | Cooper | C03C 27/06 65/43 |
| 2012/0240628 A1 | 9/2012 | Matsumoto | |
| 2015/0024151 A1* | 1/2015 | Dai | E06B 3/6612 428/34 |

FOREIGN PATENT DOCUMENTS

| | | |
|---|---|---|
| JP | 11-278877 A | 10/1999 |
| JP | 2000-063157 A | 2/2000 |
| JP | 2002-179439 A | 6/2002 |
| JP | 2008-201662 A | 9/2008 |
| JP | 2011-111352 A | 6/2011 |
| JP | 2012-140766 A | 7/2012 |
| WO | 2009/048210 A1 | 4/2009 |

* cited by examiner

FIG. 8

GLASS PANEL UNIT MANUFACTURING METHOD AND GLASS WINDOW MANUFACTURING METHOD

RELATED APPLICATIONS

This application is the U.S. National Phase under 35 U.S.C. § 371 of International Patent Application No. PCT/JP2016/004180, filed on Sep. 14, 2016, which in turn claims the benefit of Japanese Application No. 2015-192248, filed on Sep. 29, 2015, the entire disclosures of which Applications are incorporated by reference herein.

TECHNICAL FIELD

The present invention relates to a glass panel unit manufacturing method and a glass window manufacturing method.

BACKGROUND ART

A known glass panel unit includes a pair of panels which include glass and between which a vacuum space is provided (e.g., see Patent Literature 1). Such a glass panel unit may also be referred to as double glazing. The glass panel unit has an excellent thermal insulation property because the vacuum space suppresses thermal conduction. During manufacturing of the glass panel unit, two panels which are paired are bonded to each other with a space provided therebetween, and gas in the space is removed and the space is hermetically enclosed, thereby forming a vacuum space.

In a known glass panel unit manufacturing method, a sealing member surrounding the periphery of the vacuum space is formed from a glass adhesive. For example, Patent Literature 1 describes glass powder as the sealing member of the double glazing. When the glass adhesive is adopted, the glass adhesive is integrated with the panels, and thus, a glass panel unit with integrity can be obtained.

CITATION LIST

Patent Literature

Patent Literature 1: JP H11-278877 A

SUMMARY OF INVENTION

A glass adhesive adopted during manufacturing of a glass panel unit may be a material including glass powder and a binder. Including the binder enables easy application of the glass adhesive to panels. Heating the glass adhesive enables particles of the glass powder to be melted and integrated with each other while the binder is removed. However, it is not easy to sufficiently remove the binder in a manufacturing process of the glass panel unit. In the glass panel unit, if the binder is insufficiently removed and remains, the adhesive strength between the pair of panels may be reduced and/or a vacuum space between the panels may be adversely affected. Moreover, if the binder remains, coloring or discoloring of the sealing member may be caused.

An object of the present invention would be to provide a glass panel unit manufacturing method and a glass window manufacturing method which enable a binder to be effectively removed from a glass adhesive, provide high adhesive strength between a pair of panels, and enable a vacuum space to be stably formed.

A glass panel unit manufacturing method according to a first aspect of the present invention includes: an adhesive disposing step of disposing a glass adhesive on a first substrate, the glass adhesive having a shape of a frame having one part formed as a low step part, the first substrate including at least a first glass substrate, the low step part having a thickness smaller than a thickness of a remaining part of the frame, the glass adhesive including glass powder and a binder; an opposite disposition step of disposing a second substrate including at least a second glass substrate to face the first substrate (in this step, a glass composite including the first substrate, the second substrate, and the glass adhesive is formed); an inner space forming step of heating the glass composite to remove the binder and to melt the glass adhesive to form an inner space surrounded by a melted substance of the glass adhesive between the first substrate and the second substrate; a pressure reducing step of removing gas in the inner space to reduce a pressure of the inner space; and a vacuum space forming step of hermetically enclosing the inner space while keeping the inner space in a pressure-reduced state to form a vacuum space which is hermetically separated from the inner space.

A glass panel unit manufacturing method according to a second aspect of present invention includes: an adhesive disposing step of disposing a powder compact which is obtained by pre-calcining a glass adhesive, has a predetermined thickness, and forms one part of a frame on a first substrate and of disposing a glass adhesive which is not being pre-calcined, has a thickness smaller than the predetermined thickness, and forms a remaining part of the frame on the first substrate, the first substrate including at least a first glass substrate, the glass adhesive including glass powder and a binder; an opposite disposition step of disposing a second substrate including at least a second glass substrate to face the first substrate (in this step, a glass composite including the first substrate, the second substrate, and the glass adhesive is formed); an inner space forming step of heating the glass composite to remove the binder and to melt the glass adhesive to form an inner space surrounded by a melted substance of the glass adhesive between the first substrate and the second substrate; a pressure reducing step of removing gas in the inner space to reduce a pressure of the inner space; and a vacuum space forming step of hermetically enclosing the inner space while keeping the inner space in a pressure-reduced state to form a vacuum space which is hermetically separated from the inner space.

A glass window manufacturing method according to a third aspect of the present invention includes a step of fitting inside a window frame a glass panel unit manufactured by the glass panel unit manufacturing method.

The glass panel unit manufacturing method according to the first aspect or the second aspect of the present invention enables the binder to be effectively removed from the glass adhesive, increases the adhesive strength between the pair of panels, and stably forms the vacuum space to manufacture a glass panel unit.

The glass window manufacturing method according to the third aspect of the present invention provides a glass window 90 having an enhanced thermal insulation property.

BRIEF DESCRIPTION OF DRAWINGS

FIGS. 1A to 1E illustrate a glass panel unit manufacturing method according to a first embodiment, and FIGS. 1A to 1E are sectional views illustrating steps for forming a glass panel unit;

FIGS. 2A to 2C illustrate the glass panel unit manufacturing method according to the first embodiment, and FIGS. 2A to 2C are plan views illustrating steps for forming a glass panel unit;

FIGS. 3A to 3C illustrate the glass panel unit manufacturing method according to the first embodiment, and FIGS. 3A to 3C are side views illustrating steps for forming a glass panel unit;

FIGS. 4A to 4C are views schematically illustrating a glass adhesive according to the first embodiment.

FIGS. 5A to 5C illustrate a glass panel unit manufacturing method according to a second embodiment, and FIGS. 5A to 5C are side views illustrating steps for forming a glass panel unit;

FIGS. 6A and 6B illustrate a glass panel unit manufacturing method (another example) according to the first embodiment and the second embodiment, and FIGS. 6A and 6B are plan views illustrating steps for forming a glass panel unit;

DESCRIPTION OF EMBODIMENTS

Embodiments described below relate to a glass panel unit manufacturing method. More specifically, the embodiments described below relate to a method for manufacturing a glass panel including a pair of panels (a first panel T10 and a second panel T20 which will be described later) between which a vacuum space is provided.

Figure 1A:
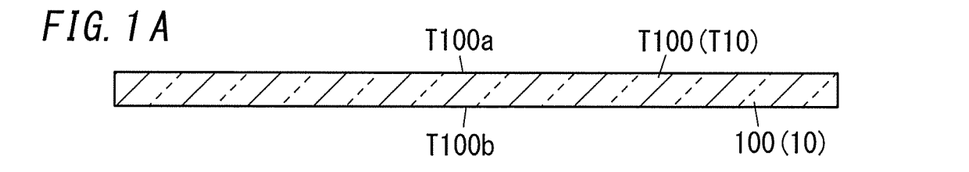
Figure 1B:
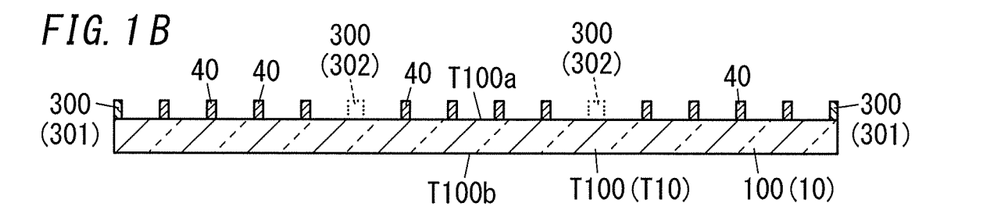
Figure 1C:
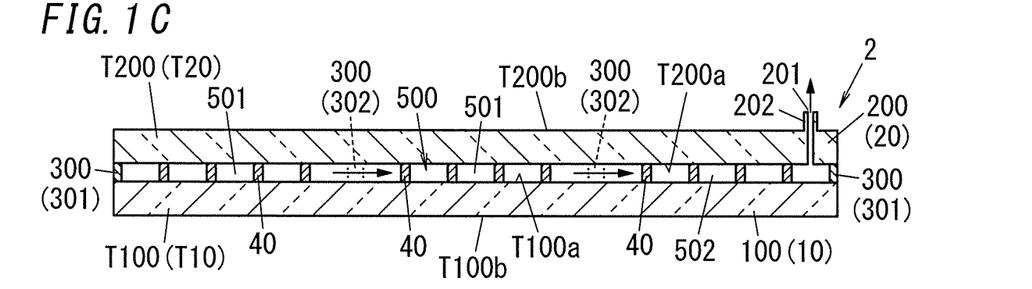
Figure 1D:
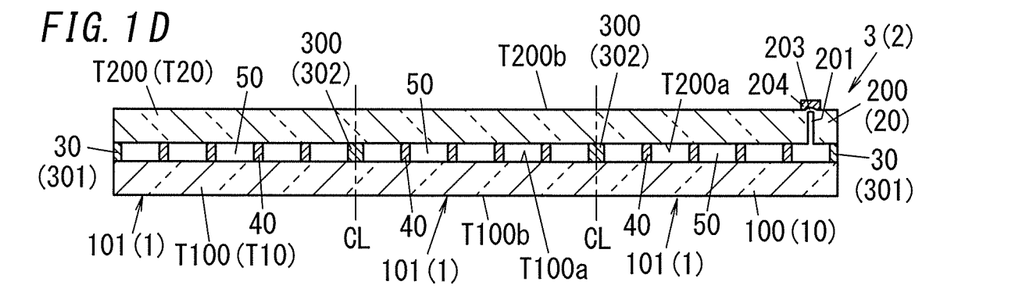
Figure 1E:
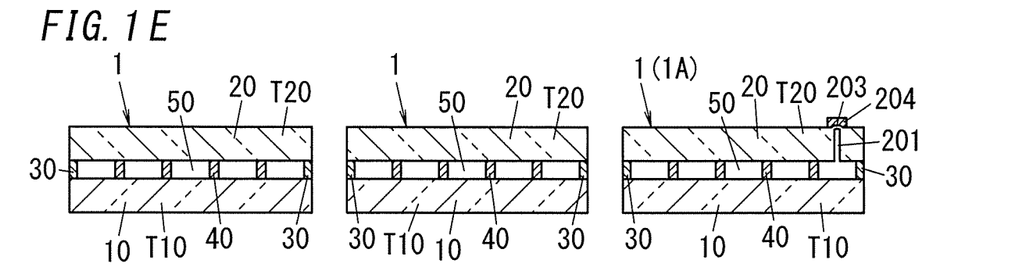
Figure 2A:
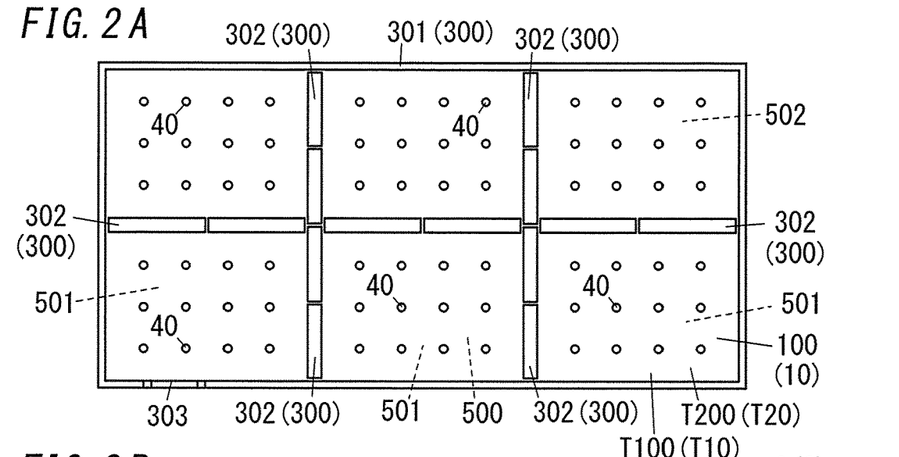
Figure 2B:
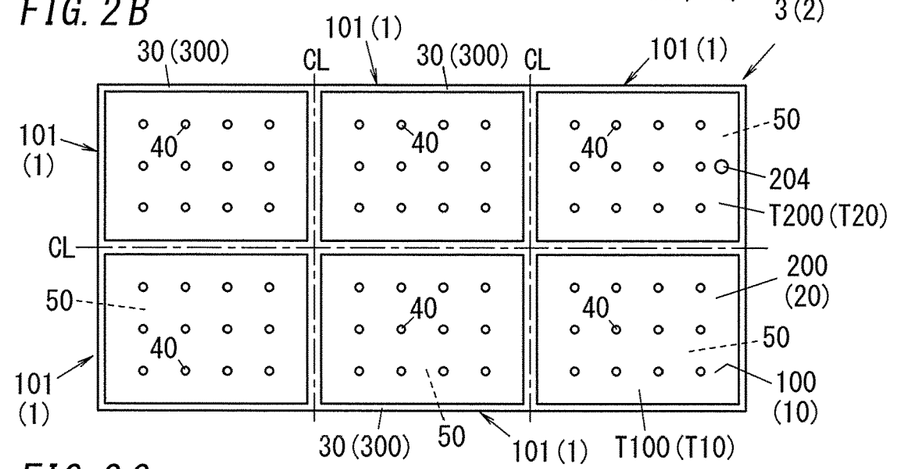
Figure 2C:
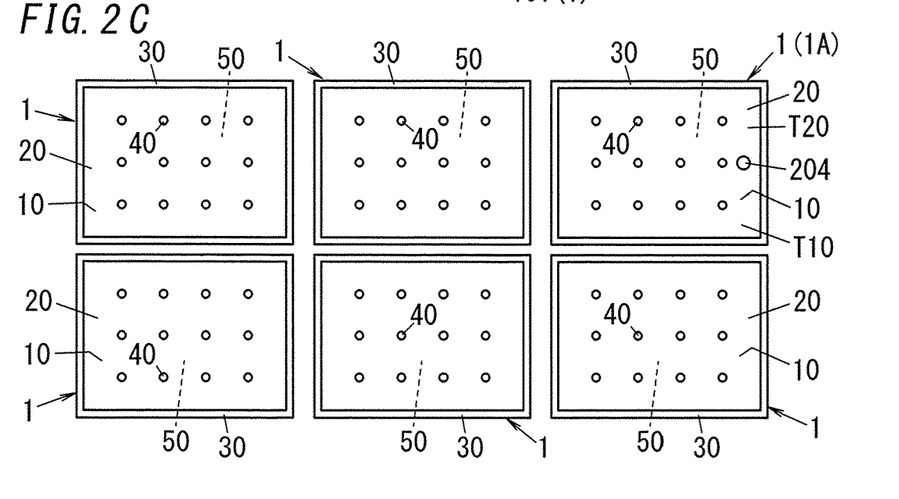

FIGS. 1 and 2 illustrate a glass panel unit manufacturing method according to a first embodiment. FIGS. 1A to 1E may be collectively referred to as FIG. 1. FIGS. 1A to 1E are sectional views. FIGS. 2 to 2C may be collectively referred to as FIG. 2. FIGS. 2A to 2C are plan views. FIGS. 1 and 2 each schematically illustrate a glass panel unit, wherein dimensions of components of the glass panel unit may be different from their actual dimensions. In particular, FIG. 1 illustrates the thickness of the glass panel unit more largely than its actual thickness so as to facilitate understanding.

FIGS. 1E and 2C each illustrate glass panel units 1 formed by the manufacturing method of the first embodiment. As illustrated in FIG. 2C, six glass panel units 1 (finished products) are obtained by the manufacturing method of the first embodiment.

The glass panel units 1 are substantially transparent. Thus, inner members (e.g., a sealing member 30 and spacers 40 which will be described later) of a glass panel unit 1 are visible from an outside of the glass panel unit 1. In FIGS. 2B and 2C, the inner members which are visible are illustrated. FIGS. 2B and 2C are views illustrating the glass panel units 1 seen from the second panel T20.

Each glass panel unit 1 includes a first panel T10, the second panel T20 facing the first panel T10, and the sealing member 30 having a frame shape and bonding the first panel T10 to the second panel T20 (see FIG. 1E and FIG. 2C).

Each glass panel unit 1 includes the spacers 40. The spacers 40 are disposed between the first panel T10 and the second panel T20. Each glass panel unit 1 has a vacuum space 50. The vacuum space 50 is provided between the first panel T10 and the second panel T20.

The first panel T10 includes at least a first glass plate 10. The first glass plate 10 has a flat surface and a predetermined thickness. In the first embodiment, the first glass plate 10 forms the first panel T10.

The second panel T20 includes at least a second glass plate 20. The second glass plate 20 has a flat surface and a predetermined thickness. In the first embodiment, the second glass plate 20 forms the second panel T20.

At the start of manufacturing the glass panel unit 1, prepared are a first substrate T100, a second substrate T200, and a glass adhesive 300 which will respectively form the first panel T10, the second panel T20, and the sealing member 30 of the glass panel unit 1 (finished product).

The first substrate T100 includes at least a first glass substrate 100. The first glass substrate 100 included in the first substrate T100 has a flat surface and a predetermined thickness. The first glass substrate 100 will form a first glass plate 10. In the first embodiment, the first glass substrate 100 forms the first substrate T100.

The second substrate T200 includes at least a second glass substrate 200. The second glass substrate 200 included in the second substrate T200 has a flat surface and a predetermined thickness. The second glass substrate 200 will form the second glass plate 20. In the first embodiment, the second glass substrate 200 forms the second substrate T200.

In the first embodiment, the size of the first substrate T100 and the size of the second substrate T200 prepared at the start of the manufacturing respectively are respectively larger than the size of the first panel T10 and the size of the second panel T20 of the glass panel unit 1 (finished product). As the first substrate T100, a substrate having a size corresponding to a plurality of (in the first embodiment, six) first panels T10 is prepared. Moreover, as the second substrate T200, a substrate having a size corresponding to a plurality of (in the first embodiment, six) second panels T20 is prepared. As in the first embodiment, a method for simultaneously manufacturing a plurality of glass panel units 1 from large-size panels is referred to as multiple production. The multiple production enables glass panel units 1 to be efficiently manufactured.

During the manufacturing of the glass panel unit 1, a glass composite 2 including the first substrate T100, the second substrate T200, the glass adhesive 300, and the spacers 40 is formed. FIG. 1C shows the glass composite 2. Moreover, during the manufacturing of the glass panel unit 1, the first substrate T100, the second substrate T200, and the glass adhesive 300 are integrated with each other, thereby forming an integrated panel 3 including the spacers 40. FIG. 1D shows the integrated panel 3.

To manufacture the glass panel unit 1, the first substrate T100 and the second substrate T200 are first prepared. FIG. 1A shows the first substrate T100 which is prepared. The first substrate T100 is formed from a plate made of glass. The first substrate T100 has a flat surface. The first substrate T100 includes the first panel T10. A panel preparing step may include processing the first substrate T100 to have an arbitrary dimension and/or disposing the first substrate T100 on a prescribed device.

FIG. 1A shows only the first substrate T100, but the second substrate T200 is also prepared separately. The preparation of the second substrate T200 includes preparing a second substrate T200 which is to be paired with the first substrate T100 and which has a prescribed dimension. The second substrate T200 is formed from a plate made of glass. The second substrate T200 has a flat surface. The second substrate T200 includes the second panel T20. FIG. 1C shows the second substrate T200 (laid over the first substrate T100). The second substrate T200 has a through hole serving as a part of an exhaust port 201. The exhaust port 201 includes the through hole penetrating the second substrate T200 and a hole in an exhaust pipe 202 connected to the second substrate T200. The preparation of the second substrate T200 may include providing the exhaust port 201 and the exhaust pipe 202 to the second substrate T200. Note that the exhaust port 201 may be formed in the first substrate T100 but not in the second substrate T200.

In the first substrate T100, a surface (which will be an inner surface of the glass panel unit 1) facing the second substrate T200 is defined as a first surface T100a, and a surface (which will be an outer surface of the glass panel unit 1) opposite to the first surface T100a is defined as a second surface T100b. In the second substrate T200, a surface (which will be an inner surface of the glass panel unit 1) facing the first substrate T100 is defined as a first surface T200a, and a surface (which will be an outer surface of the glass panel unit) opposite to the first surface T200a is defined as a second surface T200b. The first surface T100a of the first substrate T100 faces the first surface T200a of the second substrate T200.

The first substrate T100 may include a heat reflective film provided on the first surface T100a. In this case, the first substrate T100 includes the first glass substrate 100 and the heat reflective film, and similarly, the first panel T10 also includes the first glass plate 10 and part of the heat reflective film. In sum, the first panel T10 includes at least the first glass plate 10, and the first substrate T100 includes at least the first glass substrate 100. Moreover, the second substrate T200 may include a heat reflective film provided on the first surface T200a. In this case, the second substrate T200 includes the second glass substrate 200 and the heat reflective film, and similarly, the second panel T20 also includes the second glass plate 20 and part of the heat reflective film. In sum, the second panel T20 includes at least the second glass plate 20, and the second substrate T200 includes at least the second glass substrate 200.

In the glass panel unit 1, the heat reflective film may be provided to at least one of the inner surface of the first panel T10 and the inner surface of the second panel T20. Providing the heat reflective film enables heat to be reflected, which improves the thermal insulation property of the glass panel unit 1. The heat reflective film may be, for example, an infrared reflective film. The infrared reflective film can block infrared rays. The heat reflective film may be a Low-E film. The heat reflective film may have a thermal barrier property. The heat reflective film is made of, for example, a metal thin film having an infrared ray blocking property. Note that the metal thin film has a small thickness and is light transmissive. Thus, the metal thin film has substantially no influence over the transparency of the glass panel unit 1.

The thickness of the first substrate T100 and the thickness of the second substrate T200 are each, for example, in the range of 1 mm to 10 mm. In the present embodiment, the thickness of the first substrate T100 is equal to the thickness of the second substrate T200. When the thickness of the first substrate T100 and the thickness of the second substrate T200 are equal to each other, the same panels can be used, which simplifies the manufacturing. As illustrated in FIG. 2A, the first substrate T100 has a rectangular shape, and similarly, the second substrate T200 also has a rectangular shape.

Examples of materials of the first substrate T100 and the second substrate T200 include soda-lime glass, high strain-point glass, chemically strengthened glass, no-alkali glass, quartz glass, Neoceram, and physically strengthened glass.

As illustrated in FIG. 1B, after the first substrate T100 is prepared, the glass adhesive 300 is disposed (adhesive disposing step). The spacers 40 may be arranged while the glass adhesive 300 is disposed. The glass adhesive 300 and the spacers 40 are arranged on the first surface T100a of the first substrate T100. The glass adhesive 300 includes hot-melt glass. The glass adhesive 300 is disposed in the shape of a frame. The glass adhesive 300 finally forms the sealing member 30.

FIG. 2A is a top view illustrating the glass adhesive 300 and the spacers 40 arranged on the first substrate T100. The glass adhesive 300 may be disposed by application. The application may be performed with, for example, a dispenser.

The glass adhesive 300 includes at least two types of glass adhesives, namely the first glass adhesive 301 and a second glass adhesive 302. The first glass adhesive 301 and the second glass adhesive 302 are provided on respective prescribed locations. In FIG. 1B, the second glass adhesive 302 is indicated by a broken line. This means that the second glass adhesive 302 is disposed not to extend an entire length of a short side of the first substrate T100. FIG. 2A shows the arrangement of the first glass adhesive 301 and the second glass adhesive 302. Arranging the first glass adhesive 301 is defined as a first adhesive disposing step. Arranging the second glass adhesive 302 is defined as a second adhesive disposing step. The first adhesive disposing step may first be performed or the second adhesive disposing step may first be performed. For example, the second adhesive disposing step may be performed after the first adhesive disposing step.

The glass adhesive 300 includes glass powder and a binder. In the first embodiment, the first glass adhesive 301 includes glass powder and a binder, and the second glass adhesive 302 also includes glass powder and a binder. The binder facilitates dispersion of the glass powder. Moreover, the binder enables the glass adhesive 300 to be easily applied to the first substrate T100. The binder included in the first glass adhesive 301 may be the same as or different from the binder included in the second glass adhesive 302. The glass powder included in the first glass adhesive 301 may be the same as or different from the glass powder included in the second glass adhesive 302.

The glass powder includes hot-melt glass. The hot-melt glass is also referred to as low melting glass. The glass powder may be glass frit. Examples of the low melting glass frit include bismuth-based glass frit (glass frit containing bismuth), lead-based glass frit (glass frit containing lead), and vanadium-based glass frit (glass fit containing vanadium). When the low melting glass is used, a heating temperature can be lowered, which facilitates the manufacturing of the glass panel unit 1.

The binder may be made of a resin. The binder is not particularly limited. The binder can enhance the coating property of the glass adhesive 300.

The glass adhesive 300 may contain a solvent. The solvent may be an organic solvent. The solvent is removed by heating during the manufacturing of the glass panel unit 1. The binder may be dissolved or dispersed in the solvent.

As shown in FIG. 2A, the first glass adhesive 301 is disposed along an outer edge of the first substrate T100. The first glass adhesive 301 on the first substrate T100 has a single-frame shape. The second glass adhesive 302 is disposed to correspond to edges of the glass panel units 1 which are to be obtained. The second glass adhesive 302 is arranged within an area surrounded by the first glass adhesive 301.

Figure 3A:
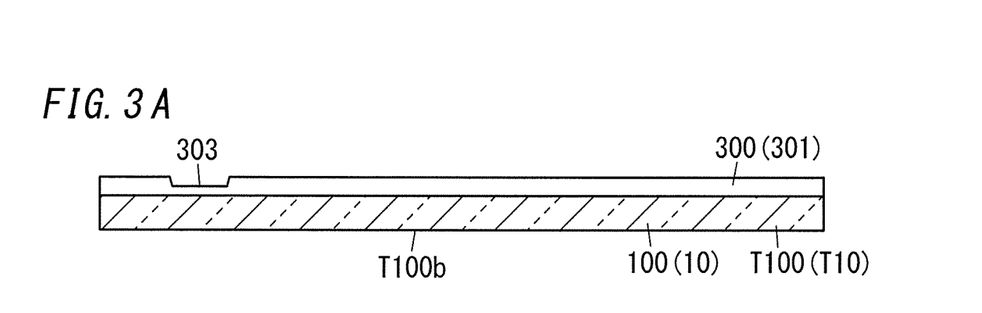

As illustrated in FIGS. 2A and 3A, the first glass adhesive 301 is disposed on the first substrate T100 in the shape of a frame having one part formed as a low step part 303 having a thickness smaller than the thickness of the other part of the frame. When a dispenser is used to dispose the first glass adhesive 301, the moving speed of a nozzle of the dispenser is increased to dispose the first glass adhesive 301 on the part where the low step part 303 is to be formed. This reduces the thickness of the first glass adhesive 301 which is disposed with a fixed ejection amount of the first glass adhesive 301 per unit time from the nozzle of the dispenser. The low step part 303 is thus formed.

Alternatively, the ejection amount of the first glass adhesive 301 per unit time from the nozzle of the dispenser may be reduced to dispose the first glass adhesive 301 on the part where the low step part 303 is to be formed with a fixed moving speed of the nozzle of the dispenser. The low step part 303 is formed also in this way.

As illustrated in FIG. 2A, in the arrangement of the glass adhesive 300, pieces of the second glass adhesive 302 are each apart from the first glass adhesive 301. In this case, the glass composite 2 has air passages each formed between the first glass adhesive 301 and each piece of the second glass adhesive 302. Air is easily removed through the air passages.

In FIG. 2A, the pieces of the second glass adhesive 302 are arranged to partition the first substrate T100 into six sections. FIG. 2A shows an example of the arrangement of the pieces of the second glass adhesive 302. The number and the arrangement pattern of the pieces of the second glass adhesive 302 are not particularly limited. The pieces of the second glass adhesive 302 are arranged to form walls. As can be seen from FIG. 2A, laying the second substrate T200 over the first substrate T100 forms an inner space 500 between the first substrate T100 and the second substrate T200. The pieces of the second glass adhesive 302 partition the inner space 500 into six sections. Note that the second glass adhesive 302 does not completely separate the inner space 500. The second glass adhesive 302 partitions the inner space 500 such that two types of spaces in the inner space 500 are in communication with each other. The two types of spaces in the inner space 500 include a first space 501 not in direct communication with the exhaust port 201 (a space without the exhaust port 201) and a second space 502 in direct communication with the exhaust port 201 (a space having the exhaust port 201). The first space 501 and the second space 502 are separated by the second glass adhesive 302. The second space 502 is provided with the exhaust port 201 by the second substrate T200 (see FIG. 1C). The first space 501 is not provided with the exhaust port 201. In the first embodiment, each piece of the second glass adhesive 302 is apart from the first glass adhesive 301, and each two pieces of the second glass adhesive 302 are apart from each other, so that a plurality of (six) spaces including the first space 501 and the second space 502 are in communication with each other. A gap between the first glass adhesive 301 and the second glass adhesive 302 and a gap between adjacent pieces of the second glass adhesive 302 serve as air passages for evacuation. In an evacuation step, air in the first space 501 passes through the air passages and is removed from the second space 502.

The spacers 40 may be arranged after the glass adhesive 300 is disposed. In this case, the spacers 40 are easily arranged. The spacers 40 may be arranged at equal intervals. Alternatively, the spacers 40 may be arranged at irregular intervals. The spacers 40 may be arranged by a chip mounter or the like. Note that the spacers 40 may be formed by a thin film formation technique.

The spacers 40 can bear force causing the first substrate T100 and the second substrate T200 to approach each other. The glass panel unit 1 includes the plurality of spacers 40. The plurality of spacers 40 secure the distance between the first panel T10 and the second panel T20, thereby easily forming the vacuum space 50. The plurality of spacers 40 are arranged at intersections of virtual lines forming a rectangular grid. Each spacer 40 of the first embodiment has a columnar shape. The spacers 40 are arranged at a pitch of, for example, larger than or equal to 10 mm and smaller than or equal to 100 mm. The shape, dimension, pitch, and arrangement pattern of the spacers 40 are not particularly limited and may be accordingly selected. Each spacer 40 may have a prism shape or spherical shape. The spacers 40 are made of a resin, metal, or the like. When the spacers 40 are made of a resin, the resin is preferably a polyimide resin. The spacers 40 may be made of a resin film.

In this embodiment, gas adsorbent may be disposed on one or both of the first substrate T100 and the second substrate T200. Pieces of the gas adsorbent are placed on respective parts which will form the glass panel units 1. Each glass panel unit 1 may include the gas adsorbent in the vacuum space 50. The gas adsorbent is provided by bonding gas adsorbent in a solid form, or applying and drying a gas adsorbent material having fluidity. The gas adsorbent may include getter. Since the gas adsorbent adsorbs gas in the vacuum space 50, the degree of vacuum of the vacuum space 50 can be maintained, and the thermal insulation property can be improved. The gas to be adsorbed on the gas adsorbent may derive from the binder.

Figure 3B:
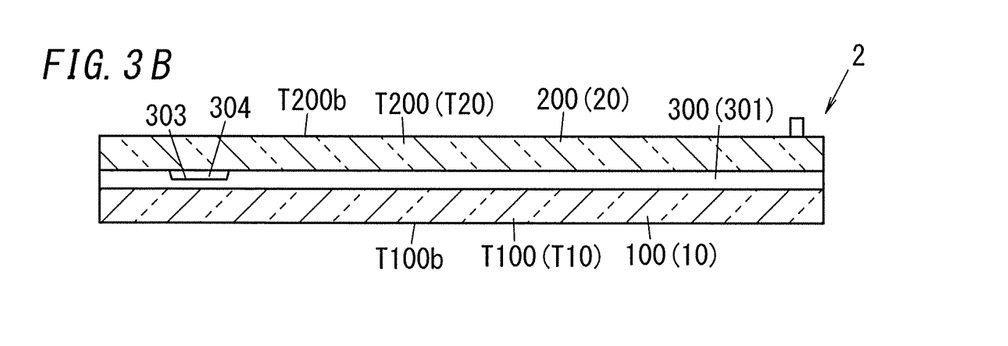

Next, as illustrated in FIGS. 1C and 3B, the second substrate T200 is disposed on the glass adhesive 300 to face the first substrate T100 (opposite disposition step). Thus, the glass composite 2 including the first substrate T100, the second substrate T200, the glass adhesive 300, and the spacers 40 is formed. The glass composite 2 has the inner space 500 between the first substrate T100 and the second substrate T200. As described with reference to FIG. 2A, the inner space 500 is partitioned. In FIG. 1C, the second glass adhesive 302 is shown by a broken line. The second glass adhesive 302 does not completely partition the inner space 500. As illustrated in FIG. 3B, a degassing gap 304 is formed at the part where the low step part 303 is provided. Forming the degassing gap 304 increases an area of the first glass adhesive 301 which is in contact with external air (atmospheric air). That is, the area facing the degassing gap 304 increases. Moreover, the inner space 500 is in communication with an external space via the degassing gap 304.

Then, the glass composite 2 is heated. The glass composite 2 may be heated in a furnace. The heating increases the temperature of the glass composite 2. An increase in the temperature by the heating causes heat-decomposition of the binder in the glass adhesive 300 and gasifies the binder, and the binder is thus removed. Then, the glass adhesive 300 reaches a hot-melt temperature, thereby melting the glass and exhibiting an adhesive property. The melting temperature of the glass adhesive 300 is higher then, for example, 300° C. The melting temperature of the glass adhesive 300 may be higher than 400° C. However, a low melting temperature of the glass adhesive is advantageous to a process. Thus, the melting temperature of the glass adhesive 300 is preferably lower than or equal to 400° C., and more preferably lower than or equal to 360° C. The first glass adhesive 301 and the second glass adhesive 302 preferably have different hot-melt temperatures.

In this embodiment, the binder included in the glass adhesive 300 is used to facilitate application of the glass adhesive 300 and is ideally completely removed during the manufacturing of the glass panel unit 1. That is, in the glass adhesive 300, particles of the glass powder can be melted and integrated with each other while the binder is removed by heating. The heating causes the heat-decomposition and gasification of the binder, thereby removing the binder. However, it is not easy to completely remove the binder in the manufacturing process of the glass panel unit 1. In the glass panel unit 1, when the binder is insufficiently removed and remains, the adhesive strength between the pair of panels (the first panel T10 and the second panel T20) may be reduced, or the vacuum space 50 may be adversely affected. Moreover, when the binder remains, coloring or discoloring of the sealing member 30 may occur. When the adhesive strength between the pair of panels is reduced, the pair of panels is likely to be separated from each other. Thus, in the first embodiment, the particle size of the glass powder is optimized as described below to increase the removal effect of the binder.

The first glass adhesive 301 is disposed on a peripheral edge of the first substrate T100. The second glass adhesive 302 is disposed to partition the area surrounded by the first glass adhesive 301.

In this embodiment, after the glass adhesive 300 is disposed, heating (pre-calcining) may be performed to remove the binder in the glass adhesive 300. The pre-calcining is performed before the panels which are paired are disposed to face each other. However, when the pre-calcining is performed, the number of manufacturing processes increases, the cost increases, and thus, the manufacturing of the glass panel unit 1 may be complicated. Moreover, after the panels which are paired are disposed to face each other, a heating time for removing the binder may be set separately from a heating time for melting the glass adhesive 300 so as to increase the total heating time. However, increasing the heating time lengthens the manufacturing process, which may increase the cost.

Thus, in the first embodiment, as illustrated in FIG. 3A, the first glass adhesive 301 is disposed to form the low step part 303, and as illustrated in FIG. 3B, the degassing gap 304 is formed at the part where the low step part 303 is formed. Thus, gas generated by heat-decomposition of the binder and residing in the first glass adhesive 301 more easily escapes through the degassing gap 304 to the outside (external space). Moreover, gas generated by heat-decomposition of the binder and residing in the inner space 500 more easily escapes through the degassing gap 304 to the outside (external space). Thus, the pre-calcining and additional heating can be omitted, thereby improving the manufacturing efficiency.

Figure 4A:
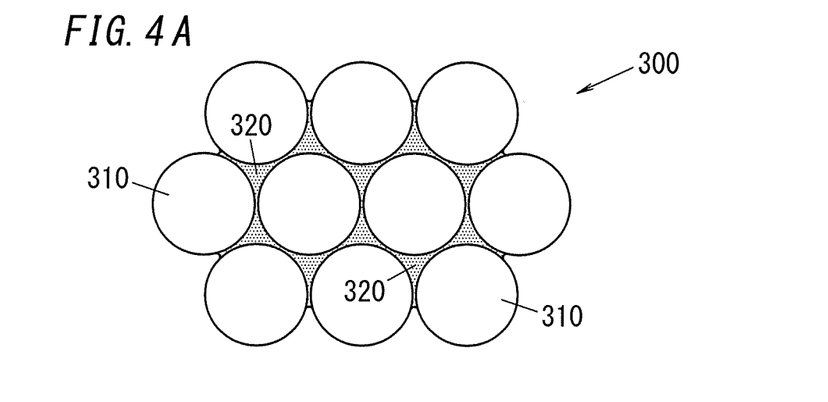
FIG. 4A shows the glass adhesive which is disposed.
Figure 4B:
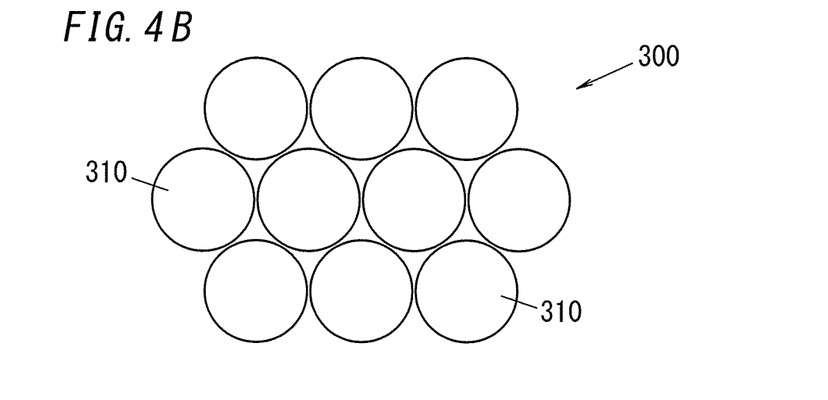
FIG. 4B shows the glass adhesive after a binder is removed.
Figure 4C:
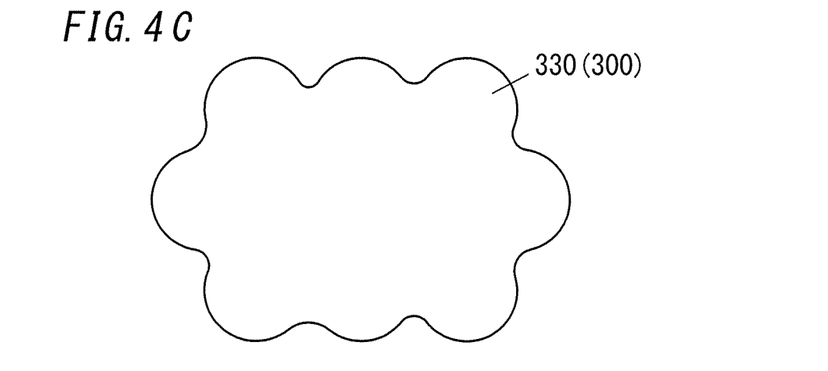
FIG. 4C shows the glass adhesive after particles of the glass adhesive are integrated.

With reference to FIG. 4, heating and melting of the glass adhesive 300 will be schematically described. FIGS. 4A to 4C schematically show the glass adhesive 300. FIG. 4A shows the glass adhesive 300 which is disposed. FIG. 4B shows the glass adhesive 300 after the binder is removed. FIG. 4C shows the glass adhesive 300, where the particles of the glass adhesive 300 are integrated.

The glass adhesive 300 of FIG. 4A includes glass particles 310 and a binder component 320. The glass particles 310 represent a plurality of particles of glass powder included in the glass adhesive 300. The binder component 320 represents a binder included in the glass adhesive 300. The binder component 320 may be dispersed in a solvent. As illustrated in FIG. 4A, when the glass adhesive 300 is applied onto the first substrate T100, the glass particles 310 are stacked on each other, and the binder component 320 is located in a gap between the glass particles 310.

When the glass adhesive 300 is heated, the binder component 320 is removed as illustrated in FIG. 4B, and the glass particles 310 remain as sediment. The heating of the glass adhesive 300 is performed to bond the first substrate T100 to the second substrate T200. In this embodiment, the binder component 320 passes through the gap between adjacent glass particles 310 and escapes to the outside. Thus, it may be difficult to sufficiently remove the binder component 320 during the manufacturing of the glass panel unit 1. If the binder component 320 remains, the adhesive strength of the glass may decrease. In particular, as described above, the second glass adhesive 302 is not exposed to the outside, and therefore, the binder component 320 of the second glass adhesive 302 is not easily removed. This is because when the first glass adhesive 301 on the peripheral edge of the first glass substrate is blown with air from the outside in heating, the binder component 320 can be removed, but the second glass adhesive 302 is located in the glass composite, and the air does not reach the second glass adhesive 302.

As illustrated in FIG. 4C, the glass particles 310 after the removal of the binder component 320 are further heated and melted to be integrated. That is, the calcining of the glass advances. A glass adhesive 300 (integrated substance 330 of the glass adhesive) which is thus integrated enables firm bonding of the first substrate T100 and the second substrate T200.

The heating as described above enables removal of the binder and melting of the glass powder to advance. The heating is preferably performed in two or more steps. For example, the temperature of the glass adhesive is increased to a temperature at which the first glass adhesive 301 melts, and heating is performed with the temperature being maintained. Thereafter, the temperature is further increased to a temperature at which the second glass adhesive 302 melts. A first stage of the heating is defined as a first heating process. A second stage of the heating is defined as a second heating process. The binder is mainly removed by the first heating process. A large part of the binder can be removed by the first heating process. However, the binder may remain after the first heating process. In this case, the binder can be further removed by the second heating process.

In the first embodiment, the first glass adhesive 301 melts at a temperature lower than the temperature at which the second glass adhesive 302 melts. That is, the first glass adhesive 301 melts earlier than the second glass adhesive 302. In the first heating process, the first glass adhesive 301 melts, but the second glass adhesive 302 does not melt. When the first glass adhesive 301 melts, the first glass adhesive 301 bonds the first substrate T100 to the second substrate T200, thereby hermetically sealing the inner space 500. The inner space 500 is a space surrounded by the first substrate T100, the second substrate T200, and a melted substance of the first glass adhesive 301. As described above, the inner space 500 is surrounded by the melted substance of the glass adhesive 300 between the first substrate T100 and the second substrate T200. A temperature at which the first glass adhesive 301 melts but the second glass adhesive 302 does not melt is defined as a first melting temperature. At the first melting temperature, the second glass adhesive 302 does not melt, and thus, the second glass adhesive 302 maintains its shape.

After the temperature of the glass adhesive reaches the first melting temperature, evacuation is started to remove gas in the inner space 500 so as to reduce the pressure of the inner space 500 (pressure reducing step). The evacuation may be performed after the temperature is reduced to a temperature (evacuation start temperature) lower than the first melting temperature. Note that as long as the glass composite 2 does not deform, the evacuation may be started before the temperature reaches the first melting temperature.

The evacuation may be performed with a vacuum pump connected to the exhaust port 201. A pipe extending from the vacuum pump is connected to the exhaust pipe 202. The evacuation reduces the pressure of the inner space 500, and the inner space 500 transitions to a vacuum state. Note that the evacuation of the first embodiment is a mere example, and other evacuation methods may be used. For example, the entirety of the glass composite 2 may be placed in a vacuum chamber, and the entirety of the glass composite 2 may be subjected to the evacuation.

In FIG. 1C, removal of the gas from the inner space 500 is indicated by the upward arrow. Moreover, a flow of air moving through the plurality of spaces including the first space 501 and the second space 502 is indicated by rightward arrows. As described above, the second glass adhesive 302 is disposed to provide the air passages. Therefore, the air passes through the air passages and is removed through the exhaust port 201. Thus, the inner space 500 including the first space 501 and the second space 502 becomes a vacuum.

While the inner space 500 is evacuated, the binder can be removed together with the air. The binder is in the glass adhesive 300 or is heat-decomposed and is located in the inner space 500. When the evacuation is performed with the vacuum pump, the binder is effectively removed. In particular, the binder is not easily removed from the second glass adhesive 302 disposed in the glass composite 2, but reducing the pressure enables the binder to be sufficiently removed.

After the degree of vacuum of the inner space 500 reaches a predetermined value, the heating temperature of the glass composite 2 is increased (second heating process). The heating temperature is increased while the evacuation continues. Increasing the heating temperature causes the temperature of the glass adhesive to reach a second melting temperature higher than the first melting temperature. The second melting temperature is higher than the first melting temperature by, for example, 10° C. to 100° C.

Here, melting the glass adhesive 300 may mean that the hot-melt glass is softened by heat to such an extent that the glass can be deformed or perform bonding. Meltability does not have to be exhibited to such an extent that the glass adhesive 300 flows.

Figure 3C:
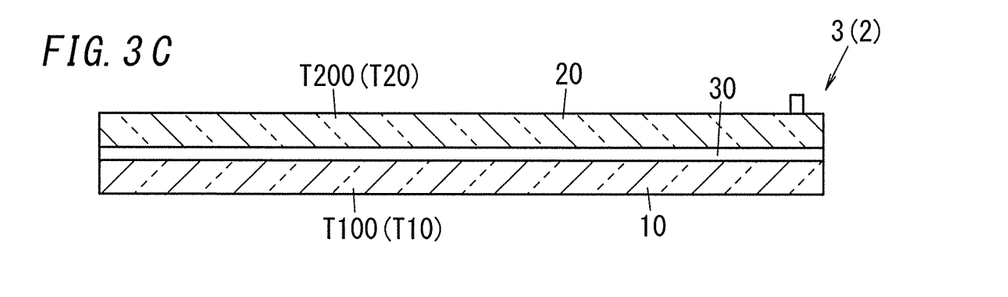

At the second melting temperature, the second glass adhesive 302 melts. The second glass adhesive 302 which is melted bonds the first substrate T100 to the second substrate T200 at the location of the second glass adhesive 302. Moreover, the second glass adhesive 302 softens due to its meltability. The second glass adhesive 302 which is softened deforms and closes the air passages. In the first embodiment, a gap (air passage) formed between the first glass adhesive 301 and the second glass adhesive 302 is closed. Moreover, a gap (air passage) between each two adjacent pieces of the second glass adhesive 302 is closed. As illustrated in FIG. 3C, the degassing gap 304 is also closed. That is, as the inner space 500 is evacuated, external air presses the first substrate T100 and the second substrate T200, and the first substrate T100 and the second substrate T200 approach to each other.

Thus, the first glass adhesive 301 and the second glass adhesive 302 decrease in thickness (i.e., the first glass adhesive 301 and the second glass adhesive 302 are pressed), thereby closing the degassing gap 304.

As described above, a melted substance of the first glass adhesive 301 comes into contact with a melted substance of the second glass adhesive 302, thereby forming a hermetically closed vacuum space 50 from the inner space 500 (vacuum space forming step). The inner space 500 is hermetically enclosed while keeping the inner space 500 in the pressure-reduced state due to the deformation of the second glass adhesive 302, thereby forming the vacuum space 50.

FIGS. 1D and 2B each show the glass composite 2 with the air passages being closed. The glass composite 2 becomes integrated due to the bonding action of the glass adhesive 300. The glass composite 2 which becomes integrated is an integrated panel 3. In the integrated panel 3, the first substrate T100, the second substrate T200, and the glass adhesive 300 are composited and integrated with each other. The integrated panel 3 includes a plurality of (in the first embodiment, six) portions 101 which will be glass panel units 1.

In the integrated panel 3, the first glass adhesive 301 and the second glass adhesive 302 are integrated, thereby forming the sealing member 30 of the glass panel unit 1. The sealing member 30 surrounds the vacuum space 50. The first glass adhesive 301 serves as a part of the sealing member 30, and the second glass adhesive 302 serves as the other part of the sealing member 30.

In the first embodiment, six vacuum spaces 50 are formed. The vacuum spaces 50 are formed by dividing the inner space 500 into a plurality of spaces. The plurality of spaces obtained by the division are not in communication with each other. The vacuum spaces 50 includes spaces formed from the first space 501 and spaces formed from the second space 502. The vacuum space 50 formed from the first space 501, having no exhaust port 201, and being completely hermetically sealed functions as the vacuum space 50 of the glass panel unit 1 as it is. On the other hand, the spaces formed from the second spaces 502 and having the exhaust port 201 becomes the vacuum spaces 50 of the glass panel unit 1 with the exhaust port 201 being sealed.

The exhaust port 201 can be closed by a sealing part 203. Thus, the vacuum of the vacuum space 50 can be maintained. The sealing part 203 can be formed from the exhaust pipe 202. The sealing part 203 may be formed by, for example, thermal welding of glass included in the exhaust pipe 202. A cap 204 is disposed outside the sealing part 203. The cap 204 covers the sealing part 203. Covering the sealing part 203 with the cap 204 enables the exhaust port 201 to be closed at a high position. Moreover, the cap 204 reduces breakage at the exhaust port 201.

After the vacuum space 50 is formed, the integrated panel 3 is cooled. Moreover, after the vacuum space 50 is formed, the evacuation is terminated. Since the vacuum space 50 is hermetically closed, the vacuum is maintained after the evacuation is terminated. Note that for safety, the evacuation is stopped after the integrated panel 3 is cooled.

Finally, the integrated panel 3 is cut. The integrated panel 3 includes the plurality of glass panel units 1. Each glass panel unit 1 includes the vacuum space 50. In FIGS. 1D and 2B, cutting locations of the integrated panel 3 are indicated by broken lines (cutting lines CL). The integrated panel 3 is cut, for example, along the outer edges of portions 101 which will be the glass panel units 1. The integrated panel 3 is cut at locations where the vacuum space 50 is not broken.

As illustrated in FIGS. 1E and 2C, when the integrated panel 3 is cut, the glass panel units 1 are individualized. The integrated panel 3 is cut, thereby obtaining the glass panel units 1. When the first substrate T100 and the second substrate T200 are cut, cut surfaces are formed in the pair of panels (the first panel T10 and the second panel T20) of each glass panel unit 1.

As described above, the manufacturing of the glass panel unit 1 preferably further includes the cutting step of cutting the first substrate T100 and the second substrate T200. Cutting the pair of panels enables the plurality of glass panel units 1 to be manufactured simultaneously. Moreover, the method of cutting the pair of panels can easily provide the glass panel units 1 having no exhaust port. In the first embodiment, a glass panel unit 1 having no exhaust port and a glass panel unit 1A still having the exhaust port 201 (which is sealed) are obtained. Having no exhaust port means that a hole for evacuation for realizing a vacuum is not provided.

The glass panel unit 1 has a rectangular shape. An outer edge of the first panel T10 is aligned with an outer edge of the second panel T20 in a plan view. The term "plan view" means that the glass panel unit 1 is viewed in the thickness direction of the glass panel unit 1.

The vacuum space 50 is hermetically enclosed by the first panel T10, the second panel T20, and the sealing member 30. The sealing member 30 serves as a sealer. The degree of vacuum of the vacuum space 50 is lower than or equal to a prescribed value. The prescribed value of the degree of vacuum is, for example, 0.01 Pa. The vacuum space 50 has a thickness, for example, larger than or equal to 10 μm and smaller than or equal to 1000 μm.

Note that the degree of vacuum of the vacuum space 50 is not particularly limited. Moreover, a reduced-pressure space enclosing gas with a pressure which is, for example, an atmospheric pressure of 0.5 or at least lower than an atmospheric pressure of 1 may be used instead of the vacuum space 50.

The glass panel unit 1 is applicable to, for example, a building. The glass panel unit 1 can be used as, for example, a window, a partition, a signage panel, and a glass plate of a showcase (including a refrigeration showcase and a warming showcase).

Next, a method for manufacturing a glass panel unit 1 of a second embodiment will be described with reference to FIG. 5. Note that a large part of the method for manufacturing the glass panel unit 1 of the second embodiment is the same as the method for manufacturing the glass panel unit 1 of the first embodiment. Thus, components similar to those in the first embodiment are denoted by the same reference signs, and the description thereof is omitted. The differences from the first embodiment will be described.

In the first embodiment, the first glass adhesive 301 is disposed on the first substrate T100 in the shape of a frame having one part formed as a low step part 303 having a smaller thickness than the other part of the frame.

Figure 5A:
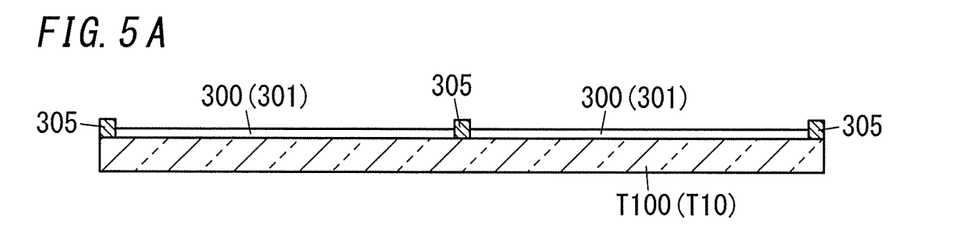
Figure 5B:
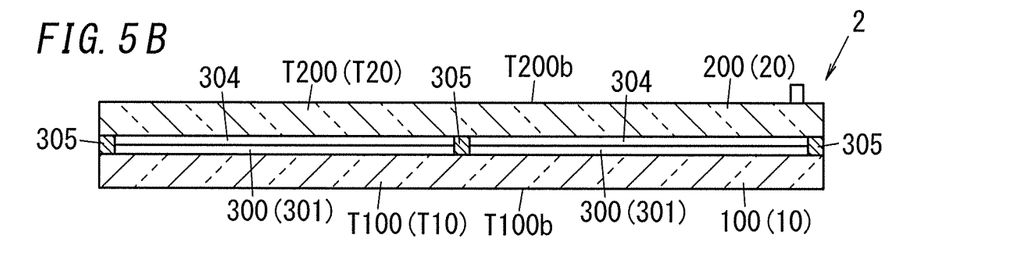
Figure 5C:
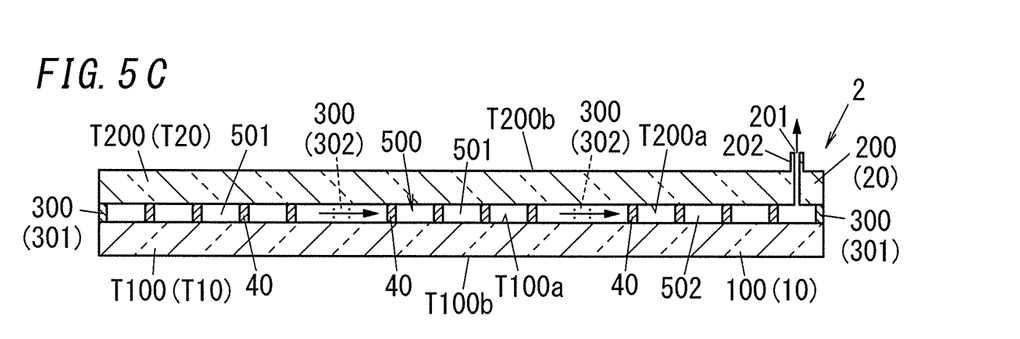

In contrast, in the second embodiment, as illustrated in FIG. 5A, a powder compact 305 obtained by pre-calcining a glass adhesive and having a predetermined thickness is disposed on one part of the first substrate. The first glass adhesive 301 not being pre-calcining and having a thickness smaller than the predetermined thickness is disposed on another part of the first substrate.

The powder compact 305 is obtained by pre-calcining the same glass adhesive as the first glass adhesive 301. The pre-calcining is performed under conditions different from conditions (temperature, time, and the like) in the first heating process and the second heating process.

The powder compact 305 being preformed and having the predetermined thickness is disposed by, for example, a chip mounter, on a part of a portion where a sealing member 30 will be formed. The number of powder compacts 305, the intervals between the powder compacts 305, and the like are not limited.

Then, on a remaining part of the portion where the sealing member 30 will be formed, the first glass adhesive 301 is disposed. The disposition of the first glass adhesive 301 is preferably performed with a dispenser. Thus, as illustrated in FIG. 5B, the part where the first glass adhesive 301 is disposed serves as the low step part, and a degassing gap 304 is formed in the low step part.

After an evacuation step, as the inner space 500 is evacuated, external air presses the first substrate T100 and the second substrate T200, and the first substrate T100 and second substrate T200 approach to each other. Thus, as illustrated in FIG. 5C, the first glass adhesive 301, a second glass adhesive 302, and the powder compact 305 are thinned, thereby closing the degassing gap 304.

Also in the second embodiment, the degassing gap 304 is formed, and thus, gas generated by heat-decomposition of a binder and residing in the first glass adhesive 301 more easily escapes through the degassing gap 304 to the outside (external space). Moreover, gas generated due to heat-decomposition of the binder and residing in the inner space 500 easily escapes to the outside (external space) through the degassing gap 304. Thus, the pre-calcining and the additional heating can be omitted, thereby improving the manufacturing efficiency.

The above-described embodiments (the first embodiment and the second embodiment) are mere examples of a method for manufacturing the glass panel unit 1. The method for manufacturing the glass panel unit 1 is not limited to the above-described embodiments. For example, a single glass panel unit 1 may be manufactured from a pair of panels.

Figure 6A:
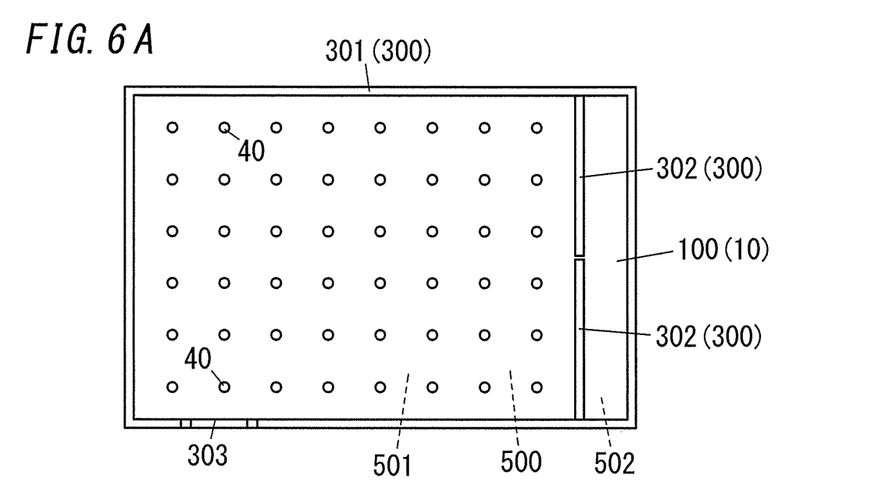
Figure 6B:
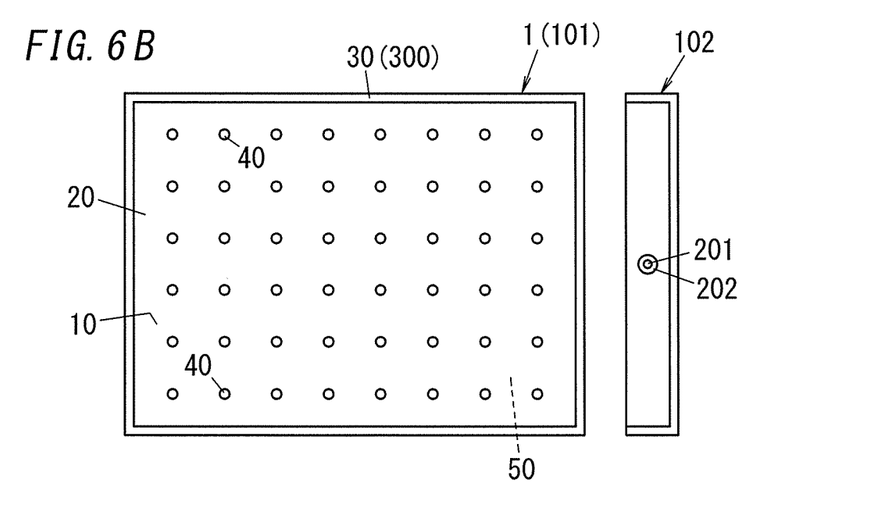

FIG. 6 is a method (another example) for manufacturing a glass panel unit 1 which can be adopted in the first embodiment and the second embodiment. FIGS. 6A and 6B are collectively referred to as FIG. 6. FIGS. 6A and 6B are plan views illustrating steps for forming the glass panel unit 1. Components similar to those described above are denoted by the same reference signs, and the description thereof will be omitted. FIG. 6A corresponds to the state of FIG. 2A (the state after the glass adhesive 300 is disposed). FIG. 6B corresponds to the state of FIG. 2C (the state after the cutting).

In the example shown in FIG. 6, a single glass panel unit 1 is manufactured from a pair of panels (a first substrate T100 and a second substrate T200). A single glass composite 2 is formed into a single integrated panel 3 and is then finally formed into the single glass panel unit 1. The example shown in FIG. 6 is not multiple production. Note that in the example shown in FIG. 6, a second space 502 is not closed and is finally removed. The integrated panel 3 includes a portion 101 which will be the glass panel unit 1 and a portion 102 which will finally be removed.

In the example shown in FIG. 6, a second glass adhesive 302 is in contact with a first glass adhesive 301, but the second glass adhesive 302 and the first glass adhesive 301 may be apart from each other. That is, the second glass adhesive 302 is only required to be disposed such that air and a binder are removed through an air passage.

The glass panel unit 1 may be manufactured by a method other than the method described above. For example, only one type of an adhesive may be used as a glass adhesive 300, and the glass adhesive 300 may be disposed on a peripheral edge of the first substrate T100. In this case, the glass adhesive 300 does not have to be divided into a plurality of pieces. A vacuum space 50 is sealed by welding an exhaust pipe 202. Note that the present manufacturing method is more effectively applied to the case where the two types of the glass adhesive 300 are used as in the above-described manufacturing method.

Figure 7A:
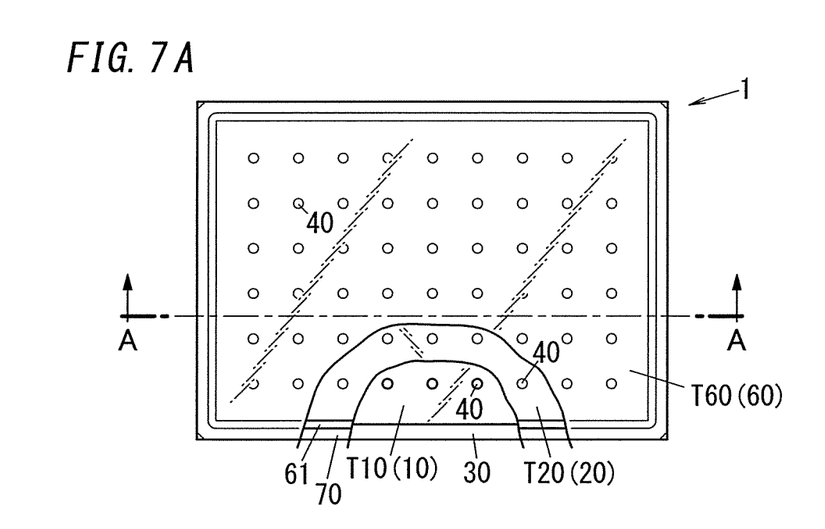
FIG. 7A is a cutaway plan view of a glass panel unit manufactured by a glass panel unit manufacturing method according to a third embodiment.
Figure 7B:
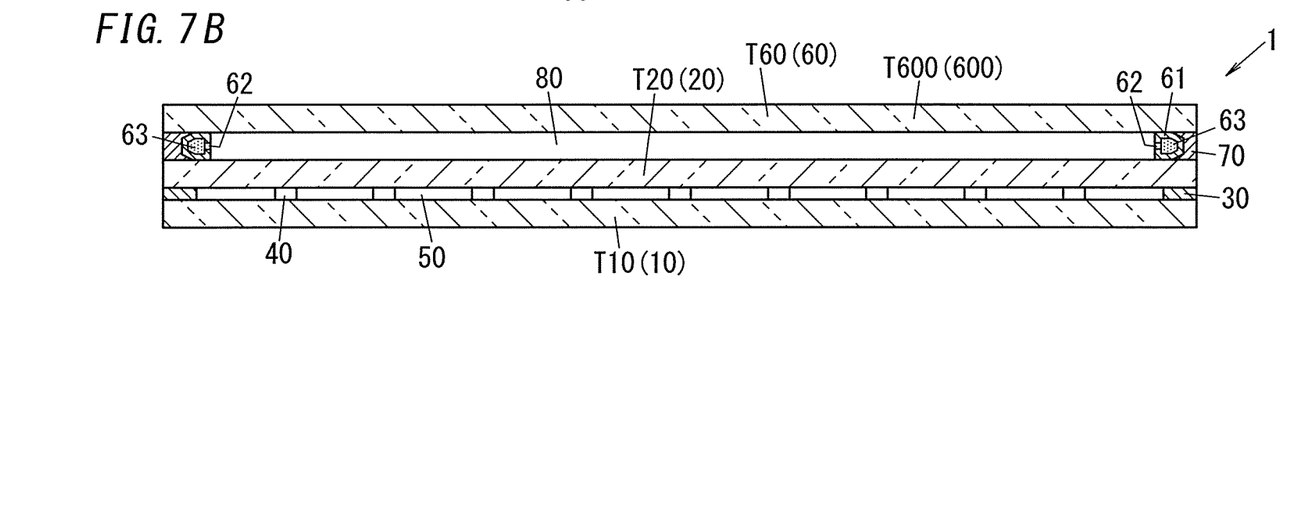
FIG. 7B is a sectional view of the glass panel unit manufactured by the glass panel unit manufacturing method according to the third embodiment.

Next, a glass panel unit 1 and a method for manufacturing the glass panel unit 1 according to a third embodiment will be described with reference to FIGS. 7A and 7B. Note that the glass panel unit 1 according to the third embodiment includes components in addition to the components of the first embodiment or the second embodiment. Thus, components similar to those in the first embodiment or the second embodiment are denoted by the same reference signs, and the description thereof will be omitted.

The glass panel unit 1 of the third embodiment includes a third panel T60 disposed to face a second panel T20. Note that the third panel T60 faces the second panel T20 for convenience sake in the third embodiment but may face a first panel T10.

The third panel T60 includes at least a third glass plate 60. The third glass plate 60 has a flat surface and a predetermined thickness. In the third embodiment, the third glass plate 60 forms the third panel T60.

Note that a heat reflective film may be provided to one of surfaces of the third panel T60. In this case, the third panel T60 includes the third glass plate 60 and the heat reflective film. In sum, the third panel T60 includes at least the third glass plate 60.

The glass panel unit 1 further includes a second sealing member 70 disposed between the second panel T20 and the third panel T60 and hermetically bonding the second panel T20 and the third panel T60 to each other. The second sealing member 70 is disposed in an annular shape between a peripheral portion of the second panel T20 and a peripheral portion of the third panel T60. The second sealing member 70 is made from a glass adhesive. In particular, the second sealing member 70 may be made from the same glass adhesive as the sealing member 30 or may be made from a glass adhesive different from the sealing member 30. A material for the second sealing member 70 is not particularly limited.

A second inner space 80 hermetically enclosed by the second panel T20, the third panel T60, and the second sealing member 70 is provided. The second inner space 80 encloses drying gas. The drying gas may be, but is not particularly limited to, a dried noble gas such as argon, dry air, or the like.

Moreover, inside the second sealing member 70 between the peripheral portion of the second panel T20 and the peripheral portion of the third panel T60, a frame member 61 which is hollow is disposed in an annular shape. The frame member 61 has a through hole 62 which is in communication with the second inner space 80. The frame member 61 accommodates desiccant 63 such as silica gel.

Moreover, the second panel T20 and the third panel T60 can be bonded substantially in the same manner as bonding of the first panel T10 and the second panel T20, and the bonding method will be described below.

First, a third substrate T600 which will form the third panel T60 and an assembly element (the glass panel unit 1 in the first embodiment or the second embodiment) including the first panel T10 and the second panel T20 are prepared. The third substrate T600 includes at least a third glass substrate 600. The third glass substrate 600 has a flat surface and a predetermined thickness. In the third embodiment, the third glass substrate 600 forms the third substrate T600. Note that a heat reflective film may be provided to one of surfaces of the third substrate T600.

A glass adhesive (third glass adhesive) which will form the second sealing member 70 is disposed on a peripheral portion of a surface of the third panel T60 or the second panel T20 in the shape of a frame (third glass adhesive disposition step). In this step, an air passage similar to that formed in the second glass adhesive 302 in the first embodiment or the second embodiment is formed in the third glass adhesive.

Next, the third substrate T600 is disposed to face the second substrate T200 (third substrate opposite disposition step).

Next, the temperature of the glass adhesive is increased to a temperature at which the third glass adhesive melts, and the temperature is maintained (third glass adhesive heating step). In the third embodiment, a second inner space forming step includes the third glass adhesive disposing step, the third substrate opposite disposition step, and the third glass adhesive heating step.

Next, drying gas is enclosed in the second inner space 80 (drying gas enclosing step). In the drying gas enclosing step, the second inner space 80 may be filled with only the drying gas, or air may remain in the second inner space 80.

Next, the air passage is closed to seal the second inner space 80 (second inner space sealing step).

The glass panel unit 1 is thus formed. The third embodiment provides a more improved thermal insulation property of the glass panel unit 1.

Figure 8:
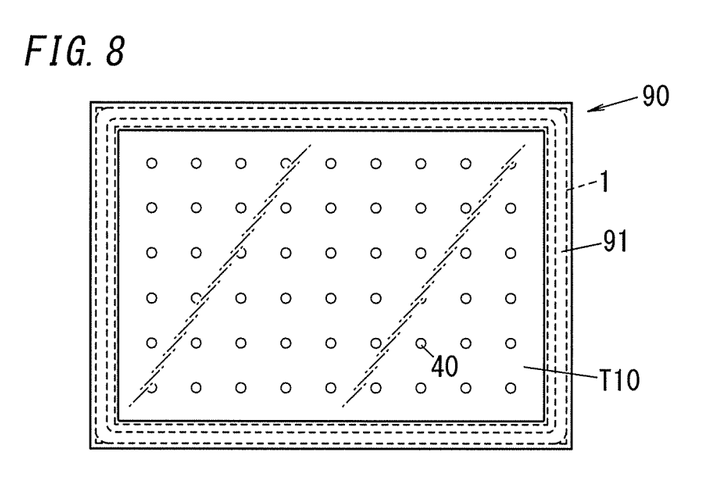
FIG. 8 is a plan view of a glass window manufactured by a glass window manufacturing method according to a fourth embodiment.

Next, a fourth embodiment will be described with reference to FIG. 8. Note that the fourth embodiment adopts a glass panel unit 1 formed by any one of the first to third embodiments to form a glass window 90. In the fourth embodiment, components similar to those in the first to third embodiments are denoted by the same reference signs, and the description thereof will be omitted.

The fourth embodiment adopts a glass panel unit 1 similar to the glass panel unit of any one of the first to third embodiments, and a window frame 91 having a U-shaped cross section is fitted to an outer side of a peripheral portion of the glass panel unit 1, thereby forming the glass window 90.

The glass window 90 of the fourth embodiment has an improved thermal insulation property.

Thus, as described above, a manufacturing method of a glass panel unit 1 of a first aspect includes an adhesive disposing step, an opposite disposition step, an inner space forming step, a pressure reducing step, and a vacuum space forming step. The adhesive disposing step is a step of disposing a glass adhesive 300 on a first substrate T100. The glass adhesive 300 has a shape of a frame having one part formed as a low step part. The first substrate T100 includes at least a first glass substrate 100. The low step part has a thickness smaller than a thickness of a remaining part of the frame. The glass adhesive 300 includes glass powder and a binder. The opposite disposition step is a step of disposing a second substrate T200 including at least a second glass substrate 200 to face the first substrate T100. In this step, a glass composite 2 is obtained. The glass composite 2 includes the first substrate T100, the second substrate T200, and the glass adhesive 300. The inner space forming step is a step of heating the glass composite 2 to remove the binder and to melt the glass adhesive 300 to form an inner space 500 surrounded by a melted substance of the glass adhesive 300 between the first substrate T100 and the second substrate T200. The pressure reducing step is a step of removing gas in the inner space 500 to reduce a pressure of the inner space 500. The vacuum space forming step is a step of hermetically enclosing the inner space 500 while keeping the inner space in a pressure-reduced state to form a vacuum space 50 which is hermetically separated from the inner space 500.

In the first aspect, the first glass adhesive 301 is disposed to form the low step part 303, thereby forming the degassing gap 304. Thus, gas generated by heat-decomposition of the binder and residing in the first glass adhesive 301 more easily escapes through the degassing gap 304 to the outside (external space). Moreover, gas which generated by heat-decomposition of the binder and residing in the inner space 500 more easily escapes through the degassing gap 304 to the outside (external space).

A method for manufacturing a glass panel unit 1 according to a second aspect includes an adhesive disposing step, an opposite disposition step, an inner space forming step, a pressure reducing step, and a vacuum space forming step. The adhesive disposing step is a step of disposing a powder compact which is obtained by pre-calcining a glass adhesive 300, has a predetermined thickness, and forms one part of a frame on a first substrate T100 and of disposing the glass adhesive 300 which is not pre-calcined, has a thickness smaller than the predetermined thickness, and forms a remaining part of the frame on the first substrate T100. The first substrate includes at least a first glass substrate 100. The glass adhesive 300 includes glass powder and a binder. The opposite disposition step is a step of disposing a second substrate T200 including at least a second glass substrate 200 to face the first substrate T100. In this step, a glass composite 2 is obtained. The glass composite 2 includes the first substrate T100, the second substrate T200, and the glass adhesive 300. The inner space forming step is a step of heating the glass composite 2 to remove the binder and to melt the glass adhesive 300 to form an inner space 500 surrounded by a melted substance of the glass adhesive 300 between the first substrate T100 and the second substrate T200. The pressure reducing step is a step of removing gas in the inner space 500 to reduce a pressure of the inner space 500. The vacuum space forming step is a step of hermetically enclosing the inner space 500 while keeping the inner space in a pressure-reduced state to form a vacuum space 50 which is hermetically separated from the inner space 500.

In the second aspect, the degassing gap 304 is formed, and thus, gas generated by heat-decomposition of the binder and residing in the first glass adhesive 301 more easily escapes through the degassing gap 304 to the outside (external space). Moreover, gas generated by heat-decomposition of the binder and residing in the inner space 500 more easily escapes through the degassing gap 304 to the outside (external space). Thus, the pre-calcining and additional heating can be omitted, thereby improving the manufacturing efficiency.

A method for manufacturing a glass panel unit 1 of a third aspect of the present invention is an additional method and is realized in combination with the method for manufacturing the glass panel unit 1 of the first aspect or the method for manufacturing the glass panel unit 1 of the second aspect. The method for manufacturing the glass panel unit 1 of the third aspect further includes a second inner space forming step of disposing a glass adhesive between a third substrate T600 and the first substrate T100 or the second substrate T200 to form a second inner space 80, the third substrate T600 including at least a third glass substrate 600, the second inner space 80 being surrounded by the third substrate T600, the first substrate T100 or the second substrate T200, and the glass adhesive.

The method for manufacturing the glass panel unit 1 of the third aspect provides a glass panel unit 1 having a further enhanced thermal insulation property.

The method for manufacturing a glass window 90 of a fourth aspect according to the present invention is an additional method. The method for manufacturing the glass window 90 of the fourth aspect is realized in combination with the method for manufacturing the glass panel unit 1 according to any one of the first to third aspect. The method for manufacturing the glass window 90 of the fourth aspect includes a step of manufacturing the glass window 90 by fitting inside a window frame 91 the glass panel unit manufactured by the method according to any one of the first to third aspects.

The method for manufacturing the glass window 90 of the fourth aspect provides a glass window 90 having a further enhanced thermal insulation property.

REFERENCE SIGNS LIST

1 Glass Panel Unit
100 First Glass Substrate
200 Second Glass Substrate
300 Glass Adhesive
301 First Glass Adhesive
302 Second Glass Adhesive
303 Low Step Part
304 Degassing Gap
305 Powder Compact
50 Vacuum Space
500 Inner Space
80 Second Inner Space
90 Glass Window
91 Window Frame
T100 First Substrate
T200 Second Substrate
T600 Third Substrate

The invention claimed is:

1. A glass panel unit manufacturing method, comprising:
    an adhesive disposing step of disposing a glass adhesive on a first substrate, the glass adhesive including glass powder and a binder and having a shape of a frame having one part formed as a low step part to form a degassing gap, the first substrate including at least a first glass substrate, the low step part having a thickness smaller than a thickness of a remaining part of the frame;
    an opposite disposition step of disposing a second substrate including at least a second glass substrate to face the first substrate and forming the degassing gap at the part where the low step part is provided;
    an inner space forming step of heating a glass composite including the first substrate, the second substrate, and the glass adhesive to remove the binder and to melt the glass adhesive to form an inner space surrounded by a melted substance of the glass adhesive between the first substrate and the second substrate;
    a pressure reducing step of removing gas in the inner space to reduce a pressure of the inner space; and
    a vacuum space forming step of hermetically enclosing the inner space while keeping inner space in a pressure-reduced state to form a vacuum space which is hermetically separated from the inner space.

2. The glass panel unit manufacturing method according to claim 1, further comprising a second inner space forming step of disposing an additional glass adhesive between a third substrate and the first substrate to form a second inner space, the third substrate including at least a third glass substrate, the second inner space being surrounded by the third substrate, the first substrate, and the additional glass adhesive.

3. The glass panel unit manufacturing method according to claim 1, further comprising a second inner space forming step of disposing an additional glass adhesive between a third substrate and the second substrate to form a second inner space, the third substrate including at least a third glass substrate, the second inner space being surrounded by the third substrate, the second substrate, and the additional glass adhesive.

4. A glass window manufacturing method, comprising a step of fitting inside a window frame a glass panel unit manufactured by the glass panel unit manufacturing method according to claim 1.

* * * * *